March 23, 1965  H. HORNSCHUCH ETAL  3,174,606
TORQUE CONTROL FOR DRIVING MEANS
Filed Dec. 20, 1962  6 Sheets-Sheet 1
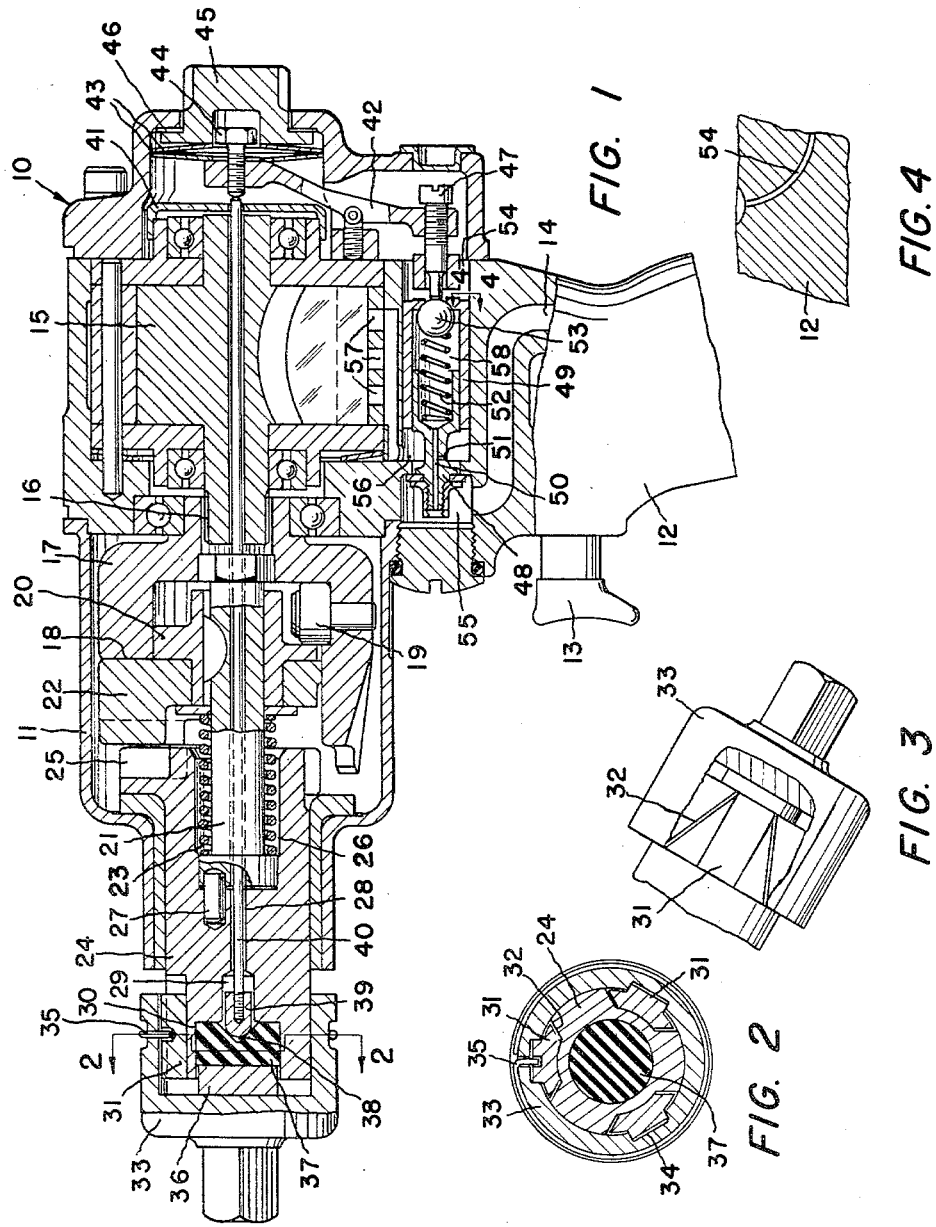
INVENTORS
HANNS HORNSCHUCH
JACK R. WEBB
BY
Arthur Frederick
ATTORNEY

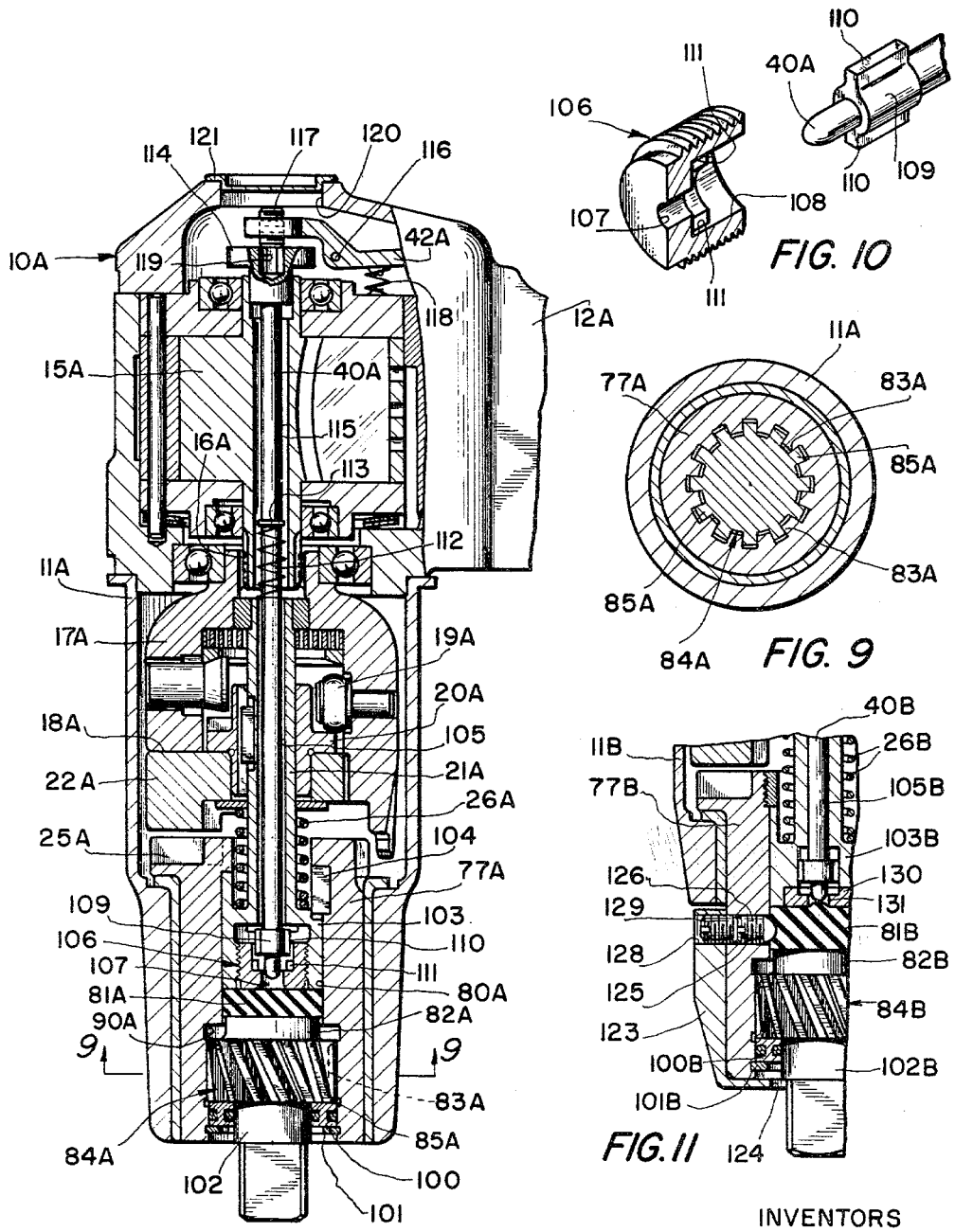

March 23, 1965  H. HORNSCHUCH ETAL  3,174,606
TORQUE CONTROL FOR DRIVING MEANS
Filed Dec. 20, 1962  6 Sheets-Sheet 4

INVENTORS
HANNS HORNSCHUCH
JACK R. WEBB
BY
ATTORNEY

March 23, 1965 H. HORNSCHUCH ETAL 3,174,606
TORQUE CONTROL FOR DRIVING MEANS
Filed Dec. 20, 1962 6 Sheets-Sheet 5

INVENTORS
HANNS HORNSCHUCH
JACK R. WEBB
BY
Arthur Fredrick
ATTORNEY

United States Patent Office

3,174,606
Patented Mar. 23, 1965

3,174,606
TORQUE CONTROL FOR DRIVING MEANS
Hanns Hornschuch, Easton, and Jack R. Webb, Bethlehem, Pa., assignors to Ingersoll-Rand Company, New York, N.Y., a corporation of New Jersey
Filed Dec. 20, 1962, Ser. No. 246,277
5 Claims. (Cl. 192—150)

This invention relates to power driven tools and more particularly to torque control means for ceasing transmission of rotary power from a source thereof to a driven means upon a predetermined torque load imposed on the latter.

This patent application is a continuation-in-part of pending U.S. patent application Serial No. 49,085, filed August 11, 1960, now abandoned.

Heretofore, various torque control means have been developed, but all have proved undesirable from one or more standpoints, such as costliness, bulkiness, and/or inaccuracy of operation. One of the many torque control devices incorporated in power tools utilizes the deceleration of a mass cooperating with a control means to effect shut-off of the motor upon a predetermined torque. The disadvantage of this device is that it functions indirectly to measure torque; that is, it provides a secondary measurement of torque load. Another type of torque control mechanism which has been employed in power tools is the rebound and overriding clutch type. The disadvantages of this mechanism are that it cannot operate under reverse rotation of the motor and it does not function consistently within a desirable range of torque tolerances. A further type of torque control mechanism which is employed in power tools comprises a torsion bar which cooperates with a motor control means to shut off the motor upon a predetermined torque. The disadvantages of a torsion bar torque control mechanism are that it is difficult to adjust for different torque load values and provides a tool which is excessively long in size.

It is, therefore, an object of this invention to provide in a power tool a torque control means which directly measures torque load and is responsive thereto to cease transmission of rotary power from a source thereof to a driven means.

It is another object of the present invention to provide in a power tool a relatively simple and inexpensive torque control means which is easy to adjust for different predetermined torque loads and is more accurate than heretofore known torque control mechanisms.

A further object of this invention is to provide a torque control means which is operative in either clockwise or counterclockwise rotation of the motor.

It is a still further object of the present invention to provide a torque control means of compact construction which has application to a wide variety of power tools where torque control is an important factor.

An additional object of this invention is to provide in a power tool a torque control means which may be readily rendered ineffective so that the tool may be used without torque control.

Accordingly, the present invention contemplates a novel control device for torque tools comprising driven means suitably connected to a source of rotary power, such as an electric motor, pneumatic motor, or the like, and a torque transmitter or means for engaging a member to be rotated. An interengaging means is associated with the torque transmitter and the driven means to transmit rotation from the driven means to the torque transmitter and, upon a predetermined torque load on the driven means, effect axial movement of the torque transmitter. A relatively incompressible means which is capable of relatively substantial flow when subjected to an external force is confined in a cavity between the torque transmitter and the driven member so that axial movement of the torque transmitter exerts an external force on the incompressible means to cause the latter to flow. The incompressible means may be a solid material, such as rubber, or may be a liquid, such as oil, water, glycerine, or the like. An actuating means, such as a rod or plunger, is disposed for movement and engagement with said incompressible means so that, upon a predetermined torque load and flow of the incompressible means, the latter forces the rod or plunger to move. The rod or plunger is connected to a control means to actuate the latter upon sufficient movement thereof and thereby cease transmission of rotary power. A torque adjusting means is provided for adjusting the assembly for various predetermined torque loads.

In one embodiment of this invention the interengaging means comprises a key means having inclined camming or wedging surfaces which engage corresponding inclined camming surfaces formed in barrel or housing of the tool. The juxtaposed wedging surfaces cooperate upon a predetermined torque load, to resolve the torque load into an axially directed force component which moves the torque transmitter axially and thereby applies an external force on the incompressible means to cause the latter to flow and move a rod which, in turn, actuates a throttle valve to a closed position.

In another embodiment of the present invention the interengaging means consists of inclined splines formed integral with the torque transmitter, which splines engage complementary inclined splines formed on the barrel or housing of the tool. The respective splines on the torque transmitter and on the barrel or housing cooperate, upon a predetermined torque, to resolve the torque load into an axially directed force component which moves the torque transmitter axially and thereby applies an external force on the incompressible means to cause the latter to flow and move a rod which, in turn, actuates a throttle valve to a closed position.

In other embodiments of this invention various means are provided for altering the volumetric dimensions of the cavity in which the incompressible means is confined so that adjustment for different torque loads may be achieved quickly and easily.

The present invention further includes two embodiments in which the incompressible means is a liquid, such as oil, water, glycerine, or the like.

In a still further embodiment of the present invention the torque control mechanism is disclosed as applied to a "lock out" type torque clutch assembly wherein the incompressible means cooperates with a ball camming plunger to unlock a clutch element and allow disengagement of the torque clutch upon a predetermined torque load.

The above and other objectives and advantages of the present invention will appear more fully hereinafter from a consideration of the detailed description which follows when taken together with the accompanying drawings wherein several embodiments of the invention are illustrated by way of example, and in which:

FIG. 1 is a longitudinal sectional view of a power tool having a torque control mechanism according to one embodiment of the present invention;

FIG. 2 is a cross sectional view taken on line 2—2 of FIG. 1;

FIG. 3 is a fragmentary view in elevation of the torque transmitter of the power tool shown in FIG. 1 with part thereof broken away for purposes of illustration;

FIG. 4 is a fragmentary cross sectional view taken along line 4—4 of FIG. 4, somewhat enlarged;

FIG. 8 is a longitudinal view in cross section of a power tool having a torque control mechanism according to a further embodiment of the present invention;

FIG. 9 is a view in cross section taken along line 9—9 of FIG. 8;

FIG. 10 is an exploded view, in perspective, and partly in cross section showing the means for adjusting the torque control mechanism illustrated in FIG. 8 for various predetermined torque loads;

FIG. 11 is a fragmentary view in cross section of a torque control mechanism, similar to FIG. 8, but showing a modified means for adjusting the mechanism for various predetermined torque loads;

Figure 5:
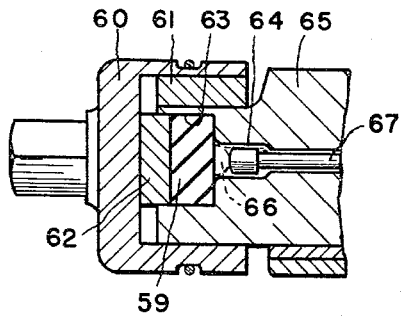
FIG. 5 is a fragmentary view in cross section of a modification of the torque transmitter shown in FIG. 1.

In the drawings, 10 generally designates an impact tool having a barrel 11 and a handle 12. The impact tool 10 has a trigger 13 and a passage 14 in the handle 12 through which fluid under pressure enters the tool, the source of fluid under pressure being connected to the bottom of the handle. The impact tool 10 has an air motor 15 and this motor is splined at 16 to a hammer 17. The hammer 17 has longitudinal slots extending inwardly from the outer end of the hammer with the slots terminating at 18. The hammer 17 carries a roller 19. A cam 20 is keyed to a spindle or shaft 21 and the shaft has a slot therein in which the key can slide so that the cam 20 may move longitudinally relative to the shaft but cannot rotate with respect to the shaft. Hammer jaws 22 are mounted on the cam 20 and are slidably disposed in the slots in the hammer 17. A coil spring 23 is mounted on the shaft 21 and bears against a washer which, in turn, bears against the hammer jaws 22. A driven member, such as an anvil 24, has jaws 25 on one end thereof that are adapted to engage the hammer jaws 22 and the one end has a recess 26 therein receiving the shaft 21 and the majority of the coil spring 23. The shaft is made non-rotatable with respect to the driven member 24 by a pin 27.

The driven member 24 has an opening 28 extending axially therethrough. The driven member is also provided with a recess 29 which communicates with the opening and a recess 30 of a larger cross sectional area than the recess 29. A plurality of keys 31, each of which has a wedge shape as shown in FIG. 3, are slidably mounted in correspondingly shaped recesses 32 in the outer end of the driven member 24. A torque transmitter 33 has grooves 34 in its inner periphery to receive the keys 31. A clip 35 is disposed in an annular groove in the outer periphery of the torque transmitter with one end of the clip projecting through an opening in the torque transmitter and into a hole in one of the keys 31. The purpose and function of clip 35 is to prevent the torque transmitter from dropping off the end of the tool and to anchor the key to the torque transmitter. As is well known by those skilled in the tool art torque transmitter 33 may be provided, as shown, with polygonal sided projection 33A which is adapted to engage a work engaging element (not shown), such as a socket adapted to receive a nut to be turned upon a threaded member (not shown). While a metal block 36 is shown disposed between the torque transmitter 33 and the driven member 24 with the block partly projecting into the recess 30, it is obvious that such block may be formed integral with torque transmitter without departing from the scope and spirit of this invention. An incompressible means capable of flowing, such as a rubber element 37, is disposed in the recess 30. Rubber element 37 has a cavity 38 therein in which is disposed the hemispherical end portion of a piece 39. A feeler means or feeler rod 40 is threadably secured at one end in piece 39 and extends through the opening 28 in the driven member 24, through an axial bore in the shaft 21, and thence through an axial bore in the rotor of the motor 15. A disc 41 is press fitted on a part of the end wall of motor 15 and serves as a guide for the rear end of the feeler rod 40. A lever 42 is pivotally mounted intermediate its ends. A pair of Belleville springs 43 are secured against one end of the lever by a cap screw 44 which extends through the Belleville springs and is threaded through the lever. A knob 45 is keyed to the cap screw 44. To secure the knob in a selected position, juxtaposed serrations are provided on adjacent surfaces of the knob and the tool housing at 46. A screw 47 is threaded through the other end of the lever 42. A trip valve 48 is slidably mounted in a housing 49 in the tool. Trip valve 48 has an aperture 50 and another aperture 51 communicating with aperture 50. A coil spring 52 is disposed in the housing 49 with one end bearing against trip valve 48 and the other end engaging a ball 53 to constantly urge trip valve 48 in an open position. The trip valve 48 has an exhaust through the passage 54.

The mode of operation of the tool is as follows: The trigger 13 is moved inwardly of the handle 12 to allow fluid under pressure to flow through the passage 14, through the chamber 55, and into the chamber 56. From chamber 56, the pressurized fluid flows through passages 57 to the motor to cause rotation of the motor 15. The rotation of the motor 15 causes rotation of the hammer 17 and, as the roller 19 moves around the cam 20, it forces the cam and the hammer jaws forwardly so that the hammer jaws 22 engage with the jaws 25 of the driven member 24. After each engagement between the hammer jaws 22 and the jaws 25, the coil spring 23 moves the hammer jaws 22 and the cam 20 rearwardly so that the tool is ready for another impact. Each impact causes further rotation of the driven member 24 and this in turn causes rotation of the torque transmitter 33 and the work engaging implement (not shown) until a predetermined torque is exerted by the work on the work engaging implement (not shown) and, in turn, on the torque transmitter. When a predetermined torque is exerted upon the torque transmitter 33, a resultant force is created against the wedge surfaces of the keys 31 and this resultant force is resolved into a component perpendicular to the longitudinal axis of the barrel and a component having a direction extending longitudinally toward the rear end of the barrel 11. This longitudinal force component causes the torque transmitter to move toward the rear end of the barrel 11 which in turn moves the block 36 rearwardly against the rubber element 37 thereby tending to compress the size of the rubber element in recess 30. Since the rubber element is substantially incompressible, the material flows into the cavity 38 or deforms in the vicinity of cavity 38 to decrease the size of the cavity. This decrease in the size of the cavity 38 causes the feeler rod 40 to be moved rearwardly of the barrel 11. With feeler rod 40 in contact with the shank of cap screw 44, rearward movement of feeler rod 40 pivots the lever 42 so that the screw 47 moves the ball 53 off its seat to allow the fluid under pressure in the chamber 58 in the housing 49 to flow through the exhaust passage 54 to the atmosphere. This causes the fluid under pressure in the chamber 55 to close the trip valve 48 thus shutting off the flow of fluid under pressure through the passages 57 and stopping rotation of the motor 15. When it is desired to adjust the predetermined amount of torque to be exerted upon the torque transmitter 33, in the field, the knob 45 is turned either clockwise or counterclockwise to move the cap screw 44 inwardly of the lever 42 or outwardly of the lever as desired.

A modified form of the invention is shown in FIG. 5. In this form of the invention the rubber element 59 is circular and is flat on both ends. When a predetermined amount of torque is exerted upon the torque transmitter 60, the keys 61 will cause a longitudinal force component to be directed toward the rear of the barrel to urge the torque transmitter 60 in a direction toward the rear end of the barrel. Rearward movement of torque transmitter 60 moves the metal block 62, which may be separate member as shown, or integral with the torque transmitter, toward the rear end of the barrel so that the rubber element 59 is caused to flow from the recess 63 into the recess 64 of the driven member 65 as indicated by the dotted lines 66. Flow or deformation of rubber element 59 into recess 64 causes the rubber element 59 to contact and move the feeler rod 67 toward the rear end of the barrel whereby shut-off of the motor is achieved.

Figure 6:
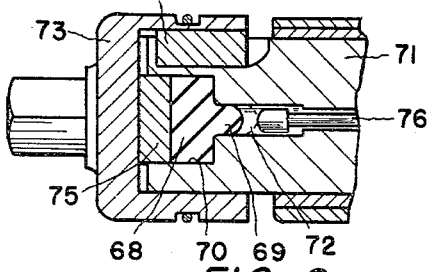
FIG. 6 is a fragmentary cross sectional view, similar to FIG. 5, of a further modification of the torque transmitter shown in FIGS. 1 and 5.

Another modified form of the invention is shown in FIG. 6. In this form of the invention the rubber element 68 is provided with a neck 69 with the rubber element being disposed in the recess 70 of the driven member 71 and the neck projecting into the recess 72 in the driven member. Upon a predetermined amount or torque being exerted upon the torque transmitter 73, the torque transmitter will wedge against the keys 74 to effect a longitudinal force component directed toward the rear end of the barrel. This longitudinal force component moves the metal block 75 which may be formed integral with the torque transmitter or as a separate member rearwardly against the rubber element 68 thereby causing the neck 69 to flow into engagement with the feeler rod 76 and effect movement of the feeler rod toward the rear end of the barrel and the actuation of the valve to shut off the motor.

Figure 7:
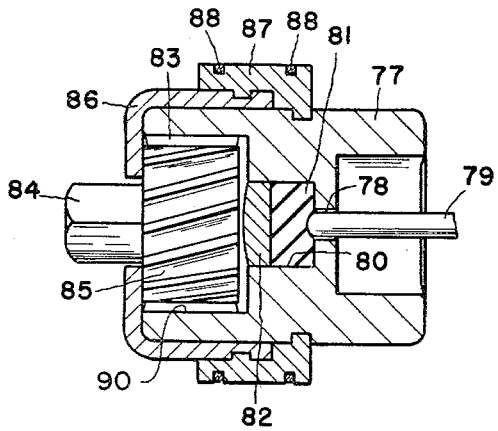
FIG. 7 is a fragmentary view in cross section of a torque transmitter according to another embodiment of this invention.

A different form of the invention is shown in FIG. 7. In this form of the invention a driven member or anvil 77 is keyed to the jaws against which the hammer jaws strike. The driven member 77 has an opening 78 therein through which the feeler rod 79 extends. The driven member also has a recess 80 in communication with the opening. A rubber element 81 is disposed in the recess 80 and a metal block 82 is also disposed in this recess. While metal block 82 is shown as a separate member from the torque transmitter 84, it may be formed as an integral part of the torque transmitter. The outer end of the driven member 77 has a counterbored portion 90 which communicates with recess 80. The peripheral surface of counterbored portion 90 is provided with helical threads or splines 83 which are adapted to mesh with helical teeth or splines 85 formed on a torque transmitter 84. A cap 86 is disposed over the forward end of driven member 77 and a pair of semi-circular elements 87 are disposed over driven member 77 and cap 86 and engage annular grooves in the driven member 77 and cap 86. A pair of O rings 88 are disposed in grooves in the semicircular elements 87 to maintain the latter in engagement with driven member 77 and cap 86. The semi-circular elements 87 and the cap 86 co-act to prevent the torque transmitter 84 from falling out of the counterbored portion 90 of the driven member 77. The helical teeth 85 and helical threads 83 cooperatively function for only one direction of rotation of the driven member 77 as for example clockwise direction of rotation. When a predetermined torque is exerted upon the torque transmitter 84, the resultant force perpendicular to the helical teeth 85 is resolved into a component perpendicular to the barrel and a component directed longitudinally toward the rear end of the barrel. This latter component causes torque transmitter 84 to move rearwardly to engage block 82 and force the latter against rubber element 81. The force exerted by block 82 against the rubber element causes the latter to flow and exerts an axial thrust upon rod 79. The axial rearward movement of rod 79 actuates the valve to shut off the motor.

The use of a rubber element enables a small deflection or deformation of the rubber in a relatively large area to be increased to a large deflection or deformation in a small area so that torque can be accurately measured. The deflection or deformation is amplified in proportion to the change in area comparing the area of the main body with the area of the flowing bead, cavity, or neck. A steel element would deflect but it would not deflect enough to give accurate measurement of torque.

Other incompressible means capable of flowing may be used instead of the rubber element. For example, a liquid could be encased in a rubber, metal or plastic container. It is also contemplated by the present invention to provide, by suitable fluid tight seals, a reservoir of liquid in place of the solid incompressible members as hereinafter shown and described.

The embodiment of the present invention illustrated in FIGS. 8 to 11 is similar to the embodiment shown in FIGS. 1 to 4, modified as shown in FIG. 7, and therefore the same reference numerals with a suffix A added thereto will be employed to designate like parts. The embodiment shown in FIGS. 8 to 11 materially differs from the embodiment shown in FIGS. 1 to 4, modified as shown in FIG. 7, in that a different means is provided for supporting the torque transmitter 84A within the anvil or driven member 77A, the metal block 82A is shown as an integral part of torque transmitter 84A, and a different means is provided for adjusting the torque control mechanism for various predetermined torque loads.

As shown in FIGS. 8 to 10, the torque control mechanism comprises, in a pneumatic impact tool, a torque transmitter 84A, similar to that shown in FIG. 7, which is secured in the counterbored portion 90A of an axial bore 80A in the anvil or driven member 77A by a seal ring 100 and a retainer ring 101. Seal ring 100 is slidably receivable on the shank 102 of the torque transmitter 84A and in counterbored portion 90A, and is held in the latter by retainer ring 101 which seats within an annular groove formed in the surface of the counterbored portion 90A.

Torque transmitter 84A has an integrally formed axial reduced body portion or pressure block 82A, equivalent to metal block 82 of FIG. 7, which projects rearwardly and is dimensioned in diameter to be slidably receivable in bore 80A of driven member 77A.

As shown in FIG. 8, a spindle 21A, similar to spindle or shaft 21 of FIG. 1, is provided with an enlarged end portion 103 which is dimensioned to fit within bore 80A. Spindle 21A is secured to driven member 77A for conjoined rotation therewith as by key 104. The spindle 21A is disposed so that the forward end thereof is spaced from the end of pressure block 82A to define with the latter and the surface of bore 80A a cavity in which is disposed a solid incompressible means in the form of a rubber disc 81A. An axial bore 105 is provided in spindle 21A through which extends a feeler rod 40A, similar to feeler rod 40 of FIG. 1. Bore 105 is counterbored in the forward end of spindle 21A, which counterbored portion is provided with threads to receive an externally threaded plug 106. As best shown in FIG. 10, plug 106 has an axial bore 107 which communicates at one end with the cavity in which is placed rubber disc 81A. The opposite end of bore 107 is counterbored at 108 and is adapted to receive one end of feeler rod 40A. The feeler rod, as best shown in FIG. 10, has a sleeve 109 spaced a short distance from the forward end of the feeler rod 40A. Sleeve 109 may be secured to the feeler rod by welding, soldering, swaging or in any other suitable manner. Sleeve 109 is provided with a pair of diametrical lugs 110 which are receivable in a pair of slots 111 formed in the bottom of counterbored portion 108 of plug 106 when feeler rod 109 is axially moved forwardly relative to plug 106. The feeler rod is biased in a rearward direction by a spring 112 which bears at one end against a washer 113 attached to the rod and, at the opposite end, rests against the rear end of spindle 21A.

The feeler rod 40A is provided with an enlarged cap 114 which is slidably and rotatably mounted in an enlarged rear end portion of an axial bore 115 extending through the rotor of motor 15A. A lever 42A is pivotally mounted at 116 with one end (not shown) engaging a throttle valve (not shown), the lever 42A and the valve being similar to lever 42 and valve 53 shown in the embodiment of FIG. 1. The opposite end of lever 42A is bifurcated with each arm having an adjustment screw 117 threaded therein (only one arm and adjustment screw being shown in FIG. 8). A spring 118 is provided to bias lever 42A around pivot 116 so that adjustment screws 117 butt against cap 114 of feeler rod 40A. In cap 114 is formed a socket 119 which is provided with a hexagonal configuration for engaging a suitable tool so that linear movement and rotation of feeler rod 40A may be achieved. While the socket is shown as hexagonal, the cap may be provided with any other suitable configuration for engagement with a tool whereby axial movement and rotation may be imparted to the feeler rod 40A. Access to socket 119 may be achieved through an access opening 120 in the housing of the power tool, which opening is normally closed by a removable cap 121.

As can be seen from the foregoing description, the torque control mechanism can be quickly and easily adjusted for various predetermined torque loads by rotating plug 106, through feeler rod 40A, so that plug 106 moves axially relative to spindle 21A and the rubber disc 81A. By movement of plug 106, the volumetric dimensions of the cavity in which is disposed rubber disc 81A is changed so that more or less space is provided, depending upon the adjustment, for the rubber disc 81A to occupy. Since the amount or flow of rubber disc 81A is directly proportional to the torque load, an increase in the size of the cavity which the rubber disc 81A can occupy, the amount of flow of the rubber disc necessary for engaging and actuating the feeler rod will increase, and thus the amount of torque force necessary to deform the rubber disc into engagement and actuation of the feeler rod will be greater. Conversely, if the size of the cavity is decreased, the less will be the amount of torque force necessary to deform the rubber into engagement and actuation of the feeler rod.

In the operation of the embodiment shown in FIGS. 8 to 10, the power tool 10A operates in the same manner as set forth with respect to the power tool 10 shown in FIG. 1 to achieve rotation of a fastener, such as a bolt or nut, in the run-down phase of operation. When the resistance to rotation imposed by the fastener on torque transmitter 84A reaches a predetermined magnitude for which the tool is adjusted, anvil or driven member 77A will be forced to rotate relative to torque transmitter 84A and, by reason of the intermeshing helical teeth or splines 85A and 83A on the respective torque transmitter and driven member 77A, the torque transmitter will be forced rearwardly against rubber disc 81A. This force exerted against the rubber disc deforms the rubber disc causing a portion of the latter to flow into bore 107 in plug 106 and into engagement against the forward end of feeler rod 40A. This force exerted on the feeler rod by the deformed rubber forces the feeler rod to move axially rearwardly against the tension of spring 112 and lever spring 118. Rearward movement of the feeler rod causes lever 42A to pivot against the tension of spring 118 and to actuate a throttle valve (not shown) to a closed position whereby flow of motive fluid to motor 15A is stopped to thus cease operation of motor 15A. Thereafter, the lever 42A and feeler rod 40A return to their preset positions under the urging of springs 112 and 118.

If it is desired to change the torque adjustment of the torque control mechanism to different torque load value at which the mechanism will stop operation of the power tool, cap 121 is removed and a suitable adjusting tool (not shown) is inserted through access opening 120 and into socket 119 of cap 114 of feeler rod 40A. By exerting axial pressure upon the adjusting tool, the feeler rod is axially moved forwardly so that lugs 110 pass into slots 111 in plug 106. Thereafter, by rotating the adjusting tool, the feeler rod is rotated which, in turn, effects rotation of plug 106 relative to spindle 21A. Since plug 106 is in threadable engagement with spindle 21A, relative rotation of plug 106 with respect to spindle 21A causes plug 106 to axially move relative to spindle 21A and rubber disc 81A. If it is desired to increase the torque setting of the power tool as shown in FIG. 8, plug 106 is rotated so as to cause it to move rearwardly away from rubber disc 81A and thereby increase the space into which the rubber disc may flow. With an increased space into which the rubber disc can flow, as previously explained, the greater will be the torque force necessary to cause the rubber disc to engage and actuate feeler rod 40A. Conversely, it is desired to reduce the torque adjustment of the power tool, plug 106 is rotated so as to cause it to move toward rubber disc 81A and thereby decrease the space into which the rubber disc can flow before contacting and effecting rearward axial movement of feeler rod 40A.

In FIG. 11 is shown a modified means for achieving adjustment of the torque control mechanism according to this invention. In the modification shown in FIG. 11 the tool is similar to that shown in FIG. 8 and therefore parts corresponding to like parts in the apparatus of FIG. 8 will be designated with like numbers to which are added the suffix B.

In the modified power tool shown in FIG. 11, the barrel 11B terminates short of the forward end of anvil or driven member 77B and a cup shaped cap 123 is fitted over the forward end of driven member 77B, which cap is dimensioned to lie in close spaced relation to the end of barrel 11B. An opening 124 is provided in the bottom wall of cap 123 through which projects torque transmitter 84B.

To provide for torque adjustment of the torque control mechanism shown in FIG. 11, a threaded hole 125 is formed in driven member 77B to extend radially from the exterior surface of the driven member into communication with the cavity in which is disposed rubber disc 81B. An adjustment or set screw 126 is turned into hole 125. The position of set screw 126 is fixed in a desired position by a lock screw 129 which is turned into a threaded hole 128 disposed in cap 123 and in register with hole 125. Lock screw 129 also functions to secure cap 123 to driven member 77B. The forward end portion 103B of spindle 40B has a plate 130 secured therein, which plate 130 is provided with a central hole 131 communicating with the cavity in which is disposed rubber disc 81B. Hole 131 is dimensioned so as to receive therein the forward end of feeler rod 40B.

To adjust the above described torque control mechanism for various torque loads applied to torque transmitter 84B, lock screw 129 is first removed from hole 128. Thereafter, by use of a suitable adjusting tool, such as a screw driver, set screw 126 is turned in hole 125 in a direction either toward and against rubber disc 81B or away from the rubber disc depending upon whether it is desired to respectively decrease or increase the torque at which the power tool will cease operating. As for example, if it is desired to increase the torque value at which the power tool will cease operation, set screw 126 is turned so as to move from the position shown in FIG. 11 in direction away from rubber disc 81B. This relieves the preset deforming force exerted on the rubber disc 81B by set screw 126 and thereby causes the amount of deformation in central hole 131 to decrease. With a decreased deformation in hole 131, a greater torque force will be required to cause sufficient deformation or flow of rubber disc 81B to effect contact and axial displacement of feeler rod 40B. After the set screw 126 is turned to the desired position of adjustment, lock screw 129 is turned into holes 128 and/or 125 until it is in firm abutment against set screw 126. Conversely, if it is desired to decrease the torque value at which the power tool will cease operation, set screw 126 is turned so as to move toward and against rubber disc 81B to thereby exert a deforming force thereon and cause the rubber disc to flow into hole 131 to a greater extent. This increased deformation of rubber disc 81B into hole 131 brings the deformed portion of the rubber disc into closer proximity to the end of feeler rod 40B and, therefore, less torque force is required to cause the rubber disc to contact and axially displace feeler rod 40B.

Figure 12:
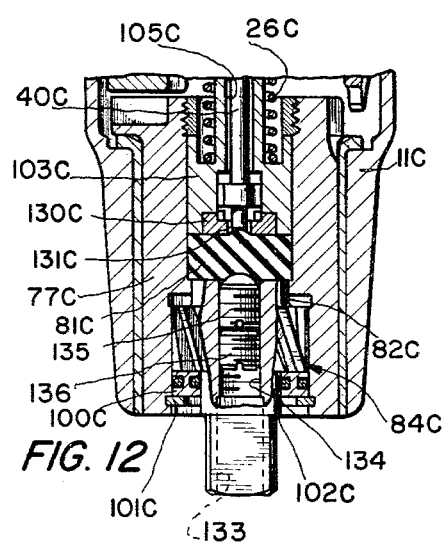
FIG. 12 is a fragmentary cross sectional view showing aonther modified means for adjusting a torque control mechanism of this invention for various predetermined torque loads.

In FIG. 12 is shown another modified means for effecting adjustment of the torque control mechanism, which means is similar to that shown in FIG. 11 except that the set and lock screws are disposed in a threaded axial bore in the torque transmitter. In view of the similarity between the apparatuses shown in FIGS. 11 and 12, the same reference numbers with the suffix C added thereto will be employed to identify parts of the apparatus shown in FIG. 12 which are the same as those shown and described with respect to the apparatus of FIG. 11.

As shown in FIG. 12, torque transmitter 84C is provided with an axial bore 133 which extends from the forward end thereof, through to the rear end thereof, and into communication with the cavity in which is disposed rubber disc 81C. The inner end portion of bore 133 is threaded at 134 to receive therein a set screw 135 and a lock screw 136.

To effect adjustment of the torque value at which the power tool will cease operation, set screw 135 is turned so as to move in a direction toward or away from rubber disc 81C by a suitable tool, such as a screw driver in the same manner as described with respect to the modification shown in FIG. 11. In a like manner as described with respect to the modification illustrated in FIG. 11, set screw 135 is locked in a selected position by turning lock screw 136 into tight abutment against the set screw.

*Torque control mechanisms utilizing a liquid*

Figure 13:
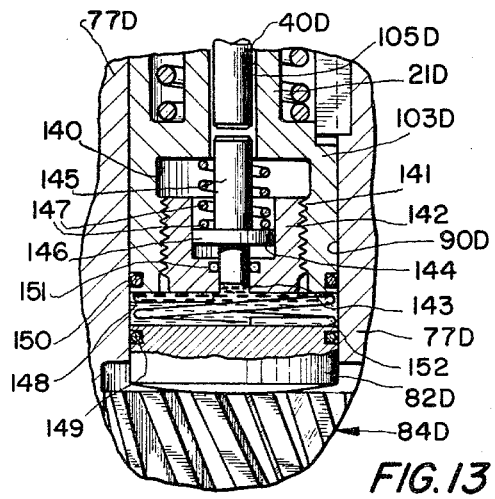
FIG. 13 is a fragmentary cross sectional view showing a torque control mechanism according to another embodiment of this invention wherein the incompressible means is a liquid.
Figure 14:
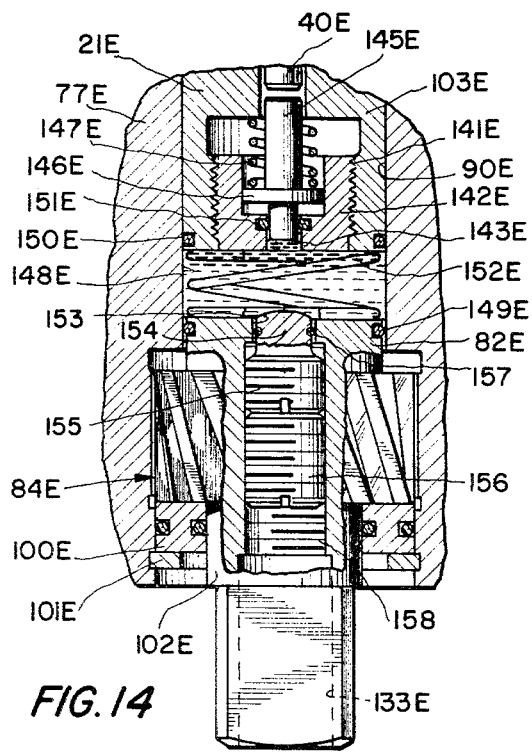
FIGS. 14 and 15 are fragmentary cross sectional views of two more embodiments of the torque control mechanism according to this invention wherein the incompressible means is a liquid.
Figure 15:
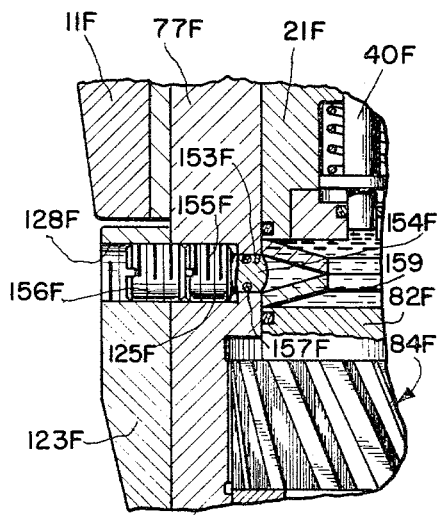

In FIGS. 13, 14 and 15 are shown three embodiments of the present invention in which the incompressible means is in the form of a liquid, as for example, water, oil, glycerine, or the like.

In the embodiment shown in FIG. 13 the forward end portion 103D of a spindle 21D is provided with a counterbored portion 140 which is partly threaded at 141 to receive an externally threaded plug 142. Plug 142 has an axial bore 143 and a counterbored portion 144 in which is disposed a piston 145. The forward end of piston 145 is reduced in diameter to be slidably receivable in bore 143 of plug 142, while the rear portion of piston 145 has an annular flanged portion 146 which is dimensioned to slidably engage counterbored portion 144 of bore 143. A spring 147 is disposed around the rear portion of piston 145 so that one end of the spring seats against flange 146 and the opposite end against a shoulder formed by counterbored portion 140 in spindle 21D. The spring 147 functions to bias piston 145 in a direction toward the torque transmitter 84D. Piston 145 is dimensioned so that the rear end of the piston extends a short distance into the bore in spindle 21D while the forward end projects into bore 143 of plug 142.

A feeler rod 40D, similar to feeler rods 40, 40A, 40B and 40C, is disposed to extend, as in the other embodiments, through an axial bore in the rotor of a motor (not shown) and through an axial bore 105D in spindle 21D. However in this embodiment, feeler rod 40D is dimensioned in length so as to terminate at its forward end in spaced relationship with the rear end of piston 145. The purpose of this spacing will be hereinafter more fully described.

As shown in FIG. 13, torque transmitter 84D is of the same construction as the torque transmitter shown in FIG. 7 and differs from those shown in FIGS. 8, 11 and 12 only in that pressure block 82D is not integral with the splined portion of the torque transmitter. As shown, pressure block 82D is provided with a spherically shaped surface adjacent the splined portion of the torque transmitter to minimize, when the splined portion of the torque transmitter exerts an axial thrust on the pressure block, transmission of rotation to the pressure block and prevent "cocking" of the pressure block in bore 90D in the anvil or driven member 77D.

The cavity defined between the juxtaposed ends of pressure block 82D, spindle 21D, and plug 142 and the surface of bore 90D, is filled with a liquid 148, such as water, oil, glycerine or the like. To prevent leakage of the liquid 148 from the cavity, the interstice between the peripheral surface of pressure block 82D and the surface of bore 90D is sealed by an O ring 149 seated within an annular groove in the peripheral surface of pressure block 82D. A similar O ring 150 is disposed in a groove formed in the peripheral surface of spindle 21D to effect a fluid tight seal between the peripheral surface of spindle 21D and bore 90D. Another O ring seal 151 is positioned in an annular groove formed in bore 143 so as to provide a fluid tight seal between the end portion of piston 145 and the portion of bore 143 in which the piston slides. A suitable means (not shown), such as a port (not shown) formed in the barrel and the anvil, is provided for initially introducing liquid 148 into the cavity and for adding make-up liquid in the event of leakage thereof from the cavity.

The liquid 148 functions, in the same manner as the incompressible means in the form of a solid rubber disc previously described, to amplify the axial force component of the torque load when pressure block 82D is moved axially under the urging of torque transmitter 84D. Since the pressure block surface adjacent liquid 148 is substantially larger in area than the surface of piston 145 adjacent liquid 148, the piston 145 is axially moved further than the pressure block, thus amplifying the axial movement of pressure block 82D. The axial movement of the pressure block 82D is directly proportional to the torque load providing there is a force resisting axial movement of pressure block 82D. This force may be provided by liquid 148 being confined in the cavity under pressure or, as shown in FIG. 13, by a spring 152 disposed between and bearing against the end surfaces of pressure block 82D and spindle 21D. Of the two alternatives, it is preferred to employ spring 152 since the liquid pressure can be maintained relatively low and thereby reduce the possibility of liquid leakage. A further alternative is to pressurize the liquid in reservoir 148 by increasing the strength of spring 147, in which arrangement spring 152 can be omitted from the mechanism.

To provide for adjusting the torque control mechanism for various torque loads at which the power tool will cease operating, feeler rod 40D is moved axially to vary the space between piston 145 and the forward end of feeler rod 40D. The mechanism for adjusting the feeler rod 40D, while not shown in FIG. 13, may be the same as shown and described in the embodiment of FIG. 1, or any other equivalent means. If it is desired to increase the torque load at which piston 145 will engage and axially move feeler rod 40D rearwardly, the latter is moved so as to increase the space between piston 145 and the feeler rod. Similarly, if it is desired to preset the torque control mechanism for a lower torque load at which piston 145 engages and axially moves feeler rod 40D, the latter is adjusted in a direction to decrease the size of the space between piston 145 and the feeler rod.

In operation of the embodiment shown in FIG. 13 and above described, pressure block 82D is forced rearwardly under the urging of torque transmitter 84D when a predetermined torque load is imposed upon the torque transmitter by a fastening member (not shown) by reason of the splined interengagement of the torque transmitter 84D and driven member 77D as previously explained with respect to the embodiments shown in FIGS. 7, 8, 11 and 12. The axial rearward movement of pressure block 82D, forces liquid 148 to flow into bore 143 and against the forward end of piston 145, thus forcing piston 145 to move rearwardly into engagement with feeler rod 40D and forces the latter to move rearwardly. As described with respect to the embodiments shown in FIGS. 1 and 8, rearward axial movement of feeler rod 40D effects actuation of a motor control means (not shown), such as valve 53 shown in FIG. 1.

The embodiment of the present invention shown in FIG. 14 is the same as that shown in FIG. 13 except that adjustment of the torque control mechanism for various torque loads is achieved by a set screw and lock screw arrangement and pressure block is formed integral with the torque transmitter, similar to that shown in FIG. 12. In view of the foregoing, the components of the torque control mechanism shown in FIG. 14 which corresponds to the components of the torque control mechanism shown in FIGS. 12 and 13 will be designated by the same reference numbers but with the suffix E added thereto.

In the torque control mechanism shown in FIG. 14, adjustment of the mechanism for various torque loads is achieved by providing torque transmitter 84E with an axial bore 133E which extends from the forward end of the torque transmitter to the rear end thereof and into communication with the cavity or reservoir 148E containing a liquid. The rear end portion 153 of bore 133E is of reduced diameter to receive the shank 154 of a set screw 155 threadably receivable in a threaded portion 158 of bore 133E. An O ring 157 is seated in a groove in the peripheral surface of shank 154 of set screw 155 to effect a fluid tight seal between the shank 154 and reduced diameter portion 153. By turning set screw 155 in a direction to cause the set screw to move toward the liquid cavity, the torque load at which the torque control mechanism will function to cease operation of the power tool will be reduced since the liquid displaced by such movement will force piston 145E in closer relationship to feeler rod 40E. Conversely, by turning set screw 155 in a direction so that it will move in a direction away from liquid cavity, the torque load at which the torque control mechanism will operate to cease operation of the power tool will be increased since the piston 145E will be allowed to move, under the urging of spring 157E, further away from the forward end of feeler rod 40E.

The selected position of set screw 155 is fixed by a lock screw 156 which is turned into tight abutment against set screw 155. The bore 133E may be utilized after removal of set screw 155 and lock screw 156, as a passageway through which liquid may be initially flowed into reservoir 148 or through which make-up liquid may be added, if required.

With the herein described torque adjustment arrangement shown in FIG. 14, the mechanism at the rear end of the power tool, as shown in FIG. 1, for adjusting the feeler rod 40E may be omitted.

In FIG. 15 is shown a modification of the torque control mechanisms shown in FIGS. 13 and 14 wherein a set screw and lock screw arrangement, similar to that shown in FIG. 11, is provided for adjusting the mechanism for various torque loads. Accordingly, parts of the torque control mechanism shown in FIG. 15 corresponding to like parts of the mechanisms shown in FIGS. 11 and 14 will be designated by the same reference numbers but having the suffix F added thereto.

The set screw and lock screw torque adjusting means as shown in FIG. 15 comprises a set screw 155F which is turned into a threaded bore 125F extending radially in anvil or driven member 77F. The inner end portion 153F of bore 125F is reduced and slidably receives therein shank 154F of set screw 155F. An O ring 157F is disposed in an annular groove in shank 154F to provide a fluid tight seal between the shank and reduced portion 153F of bore 125F. The adjustment of set screw 155F is held in a fixed position by a lock screw 156F turned into a threaded opening 128F formed in a cap 123F, which opening registers with bore 125F in driven member 77F. As shown, lock screw 156F is turned into tight abutment against set screw 155F. The turning of set screw 155F in a direction to move it toward or away from the liquid cavity effects torque load adjustment in the same manner as previously described with respect to the mechanism shown in FIG. 14.

The torque control mechanism shown in FIG. 15 also differs from the modifications shown in FIGS. 13 and 14, in that a Belleville type spring 159 is substituted for the coil springs 152 and 152E employed in FIGS. 13 and 14, respectively.

*Torque control mechanism for "lock-out" torque clutch assembly*

The embodiment shown in FIG. 16 to FIG. 21 is directed to the application of the present invention to a power tool having a torque clutch lock-out mechanism, commonly referred to as a "lock-out" clutch.

As shown in FIGS. 16 to 21, the power tool 160 comprises a housing 161 in which is mounted a motor (not shown) having a rotor 162 suitably supported at one end in the housing by a bearing 163. A torque transmitter 164, similar to the torque transmitters shown in FIGS. 7, 8, 11 to 15, is secured to rotor 162. The helical teeth or splines 165 of the torque transmitter mesh with complementary splines 166 formed in an axial bore provided in a driving clutch element 167 so that rotation of rotor 162 is transmitted to clutch element 167.

Figure 19:
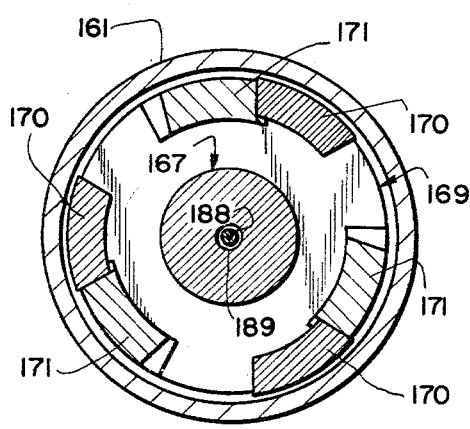
FIG. 19 is a view in cross section taken substantially on line 19—19 of FIG. 16.
Figure 20:
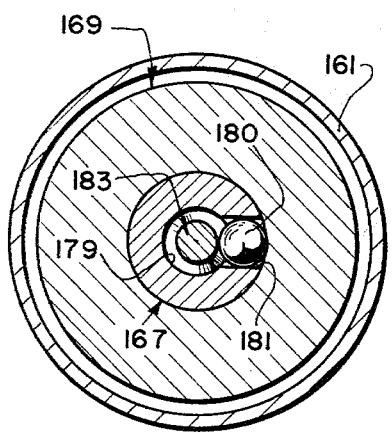
FIG. 20 is a cross sectional view taken substantially on line 20—20 of FIG. 17.
Figure 21:
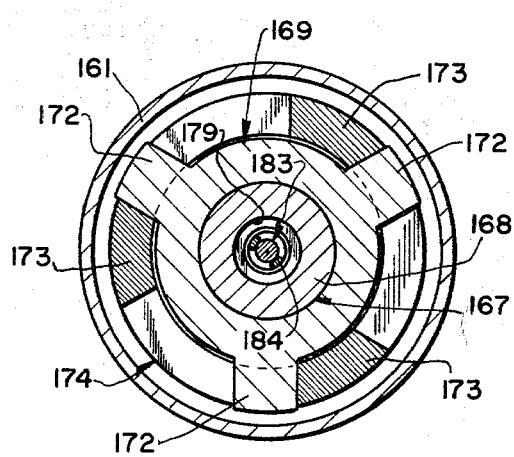
FIG. 21 is a view in cross section taken substantially along line 21—21 of FIG. 16.

Driving clutch element 167 is provided with an integral tubular stem 168 on which is slidably mounted a driven clutch element 169. Driving clutch element 167 is provided, as best shown in FIG. 19, with a plurality of spaced jaws 170. Driven clutch element 169 is provided with a plurality of spaced jaws 171 which, in the clutch engaged position, abut jaws 170 of driving clutch element 167 so that rotation is transmitted from the driving clutch element to the driven clutch element 169. The abutting end faces of jaws 170 and 171 are inclined so that the torque force is resolved into an axial force component which tends to force clutch elements 167 and 169 apart or to a clutch disengaged position.

A second clutch is provided which clutch comprises a plurality of spaced jaws 172 formed on clutch element 169 and a plurality of spaced jaws 173 which are formed on a tool holder 174. The jaws 172 and 173 are disposed to abut one another in the engaged position of the clutch so that rotation of clutch element 169 is transmitted to tool holder 174. The abutting end walls of the jaws 172 and 173 are flat vertical walls so that full torque force is transmitted from one to the other.

Tool holder 174 is supported in housing 161 for rotation and axial movement by an internal annular shoulder 175 formed in the forward end portion of housing 161. Tool holder 174 is provided with an integral axial extension 176 and a spaced concentric integral cup shaded member 177 which carries jaws 173. Axial extension 176 and cup shaped member 177 define therebetween an annular space 178 into which is slidable receivable driven clutch element 169 and tubular stem 168 of driving clutch element 169, axial extension being slidably receivable in the bore 179 of tubular stem 176.

The lock and prevent clutch element 169 from disengaging from clutch element 167 before a predetermined torque load is imposed thereon, a locking means, such as ball 180, is disposed in an opening 181 in the wall of tubular stem 168 and is of such diameter as to partially extend into an annular recess 182 of frusto conical shape in cross section formed in the surface of clutch element 168 adjacent the peripheral surface of the tubular stem. While one ball 180 is shown, it is to be understood that a plurality of spaced balls may be carried by the tubular stem in a plurality of spaced openings 181 without departing from the scope and spirit of this invention.

To prevent the ball 180 from being cammed out of recess 182, a camming plunger 183 is disposed for slidable movement in bore 179 of tubular stem 168. Plunger 183 is biased in a rearward direction by a coil spring 184 which, at one end, abuts plunger 183 and, at the opposite end, bears against the bottom of an axial recess 185 formed in axial extension 176 of tool holder 174. Plunger 183 has a frusto-conical shaped portion 186 which merges with a reduced diameter portion 187. A pin 188 which may be formed integral with plunger 183 projects axially from reduced diameter portion 187 into an opening 189 in a wall separating bore 179 from a cavity or axial recess 190 provided in driving clutch element 167.

Figure 16:
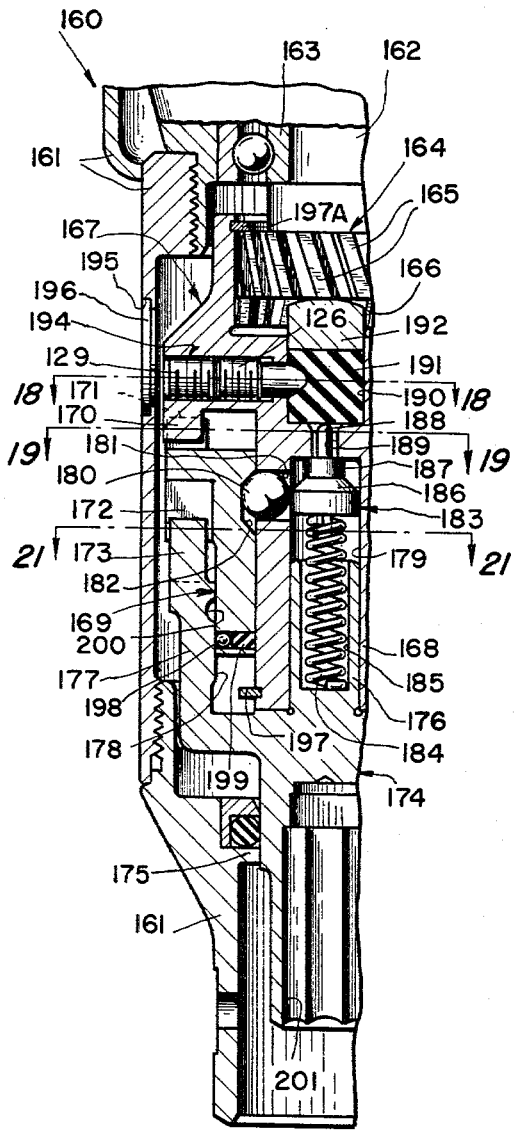
FIG. 16 is a fragmentary longitudinal view in cross section of a torque control mechanism according to this invention as applied to "lock out" type torque clutch assembly.
Figure 17:
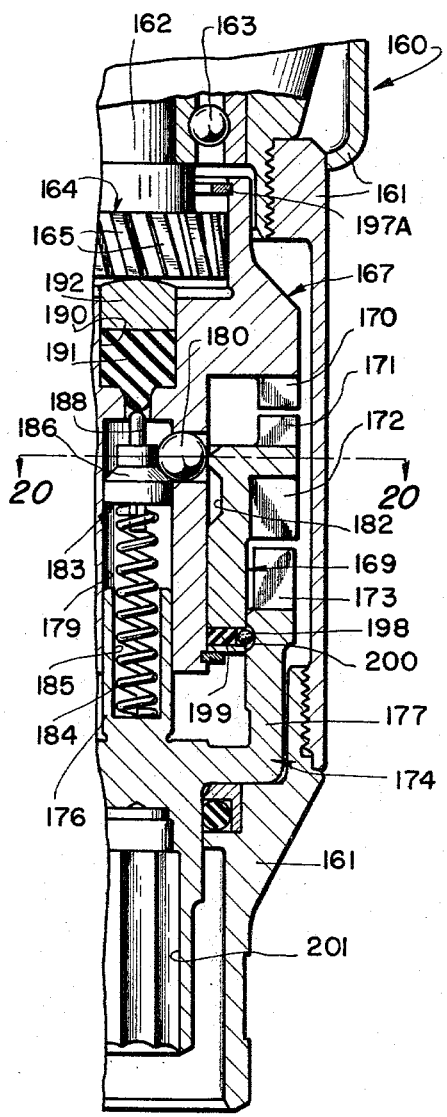
FIG. 17 is a view similar to FIG. 16, rotated 180°, showing the torque clutch assembly in the disengaged position.
Figure 18:
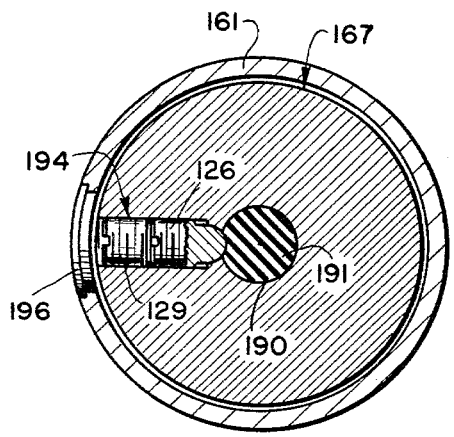
FIG. 18 is a cross sectional view taken substantially on line 18—18 of FIG. 16.

Actuation of plunger 183 to release ball 180 upon a predetermined torque load is achieved by torque transmitter 164 cooperating with an incompressible means of solid or liquid material, which elements constitute the torque control mechanism according to this invention. For illustration purposes, the incompressible means in FIGS. 16 and 17 is shown as a solid rubber member 191 which is disposed in recess 190 of driving clutch element 167 and confined therein by a pressure block 192. Pressure block 192 is disposed for slidable movement in recess 190 and is dimensioned to extend from recess 190 into the torque transmitter receiving bore in driving clutch element 167. As shown in FIG. 17, upon a predetermined torque, torque transmitter 164 axially moves forward relative to driving clutch element 167 into engagement with pressure block 192 to force the latter against rubber member 191 which is thereby deformed in the vicinity of opening 189 and flows into the latter. This deformation into opening 189 forces plunger 183 to move axially against the tension of spring 184 so that reduced portion 187 of plunger 183 is brought into alignment with ball 180. With the reduced portion 187 in alignment with ball 180, the ball is free to move inwardly in opening 181 and out of annular recess 182 in driven clutch element 169 to thus release the latter for axial movement away from driving clutch element 167.

To provide for adjustment of the torque control mechanism for actuating plunger 183 at various desired torque loads, a set screw and lock screw assembly 194 is disposed in driving clutch element 167. This set screw and lock screw assembly is structurally and functionally the same as that disclosed in the embodiment shown in FIG. 11 and, therefore, the same reference numbers designating the components of the set screw and lock screw assembly shown in FIG. 11 will be employed to designate the corresponding components in the embodiment shown in FIGS. 16 and 18. Access to lock screw 129 and set screw 126 is accomplished through an access port 195 in housing 161 after removal of a closure 196 from port 195.

Relative movement of driven clutch element 169 and driving clutch element 167 is limited by a stop ring 197 mounted on the forward end of tubular stem 168 of the driving clutch. Similarly, movement of torque transmitter 164 relative to driving clutch element 167 is limited by a stop ring 197A carried by clutch element 167.

As shown in FIG. 17 tool holder 174 is locked out of engagement with driven clutch element 169 by a ball 198 which is carried in a recess in clutch element 169. Ball 198 is biased in a direction toward cup shaped member 177 of tool holder 174 by a rubber block 199. A small coil spring may be employed in place of rubber block 199, if so desired. A depression 200 is provided in the tool holder 174 so that, when there is relative movement between the tool holder and driven clutch element 169, the ball 198 engages depression 200 to maintain the tool holder and driven clutch element out of engagement.

In operation of the power tool illustrated in FIGS. 16 to 21, the motor (not shown) is operated to rotate rotor 162 which, in turn rotates torque transmitter 164. Rotation of torque transmitter 164 is transmitted to driving clutch element 167 by reason of the interengagement of splines 165 and 166 on the respective torque transmitter 164 and driving clutch element 167. The rotation of driving clutch element 167 is transmitted to driven clutch element 169 through the abutting jaws 170 and 171 associated with the clutch elements 167 and 169. Rotation is further transmitted, through the abutting jaws 172 and 173 on the driven clutch element 169 and tool holder 174, respectively, to the tool holder 174. Rotation of tool holder 174 is transmitted to a fastener engaging tool (not shown) which is suitably secured in recess 201 provided in the forward end of tool holder 174. The rotation of the fastener engaging tool (not shown) effects rotation of a fastener (not shown), such as, a nut, bolt or screw.

Since the abutting end surfaces of jaws 170 and 171 are inclined the torque transmitted through the abutting jaws is resolved into an axial force component which tends to cause separation and disengagement of driving clutch element 167 and driven clutch element 169. However, since ball 180 is held by plunger 183 in recess 182, driven clutch element 169 is prevented from axially moving forwardly away from driving clutch element 167.

When the torque load or resistance to rotation imposed on the tool holder and clutch elements by the fastener (not shown) reaches a predetermined value, the torque transmitter, being driven by the rotor 162 of the motor (not shown), rotates relative to driving clutch element 167 and moves axially forwardly toward and into contact with pressure block 192 by reason of the camming action of the helical splines 165 and 166 which resolves the torque force into an axial force component directed along the axis of the power tool. The torque transmitter 164 exerts, through pressure block 192, a force upon rubber member 191 which is thereby deformed in the vicinity of opening 189 and flows into the latter to apply an axial force on pin 188 of plunger 183. This axial force causes plunger 183 to move within bore 179 against the tension of spring 184 to a position where reduced portion 187 of the plunger comes into alignment with ball 180. As best shown in FIG. 17, when reduced portion 187 of the plunger comes into alignment with ball 180, the ball is free to be cammed out of recess 182 under the urging of the axial force tending to move driven clutch element 169 out of engagement with driven clutch element 167. With the ball 180 cammed out of recess 182, driven clutch element 169 moves forwardly relative to the driven clutch member 167 to thereby effect disengagement of jaws 170 and 171 as illustrated in FIG. 17. This disengagement of jaws 170 and 171, interrupts transmission of rotary motion from driving clutch element 167 to driven clutch element 169 so that no torque is transmitted to the fastener (not shown) through the fastener engaging tool (not shown) and tool holder 174.

When the operator removes the power tool from the fastener (not shown), tool holder 174 is forced by spring 184 which has been compressed by movement of plunger 183 forwardly relative to driving clutch element 177 to thereby disengage jaws 172 and 173. As shown in FIG. 17 jaws 173 of tool holder 174 are maintained out of engagement with jaws 172 of the driven clutch element 169 by ball 198 which is urged by resilient rubber block 199 into recess 200 in the tool holder 174.

After the operator positions the power tool in proper engaging relationship to another fastener (not shown) and applies an axial pressure on the power tool, tool holder 174 unlocks and moves rearwardly so that jaws 172 and 173 reengage each other. The rearward axial pressure on tool holder 174 forces ball 198 out of recess 200 against rubber block 199 so that the tool holder is freed for rearward movement. Further axial pressure by the operator, forces driven clutch element 169 axially rearwardly by reason of the abutment of jaws 173 of tool holder 174 against the driven clutch element. Upon rearward movement of clutch element 169, annular recess 182 is brought in alignment with ball 180 which allows surface 186 of plunger 183 to cam ball 180 into recess 182 as the plunger is moved rearwardly by spring 184 to the position shown in FIG. 16. Simultaneously, rearward movement of driven clutch element 169 brings jaws 171 of the driven clutch element into reengagement with jaws 170 of driving clutch element 167 so that all of the components of the power tool are restored to torque transmitting relationship as shown in FIG. 16. The power tool is then operated as previously described to effect the tightening of another fastener (not shown).

While the invention has been described as applied to a power tool having a pneumatic motor, the invention should not be limited to such application. The invention has application to power tools which may have electric or hydraulic motors or devices of various types where cessation of torque transmission upon a predetermined torque load is desired.

It is believed now readily apparent that the present invention provides a torque control mechanism which has relatively broad application to apparatuses and devices where interruption of torque transmission upon a predetermined torque load is desired. It is an invention which permits the construction of shorter and lighter weight power tools than was heretofore possible. The torque control mechanism, according to this invention, is capable of quick and easy adjustment for various torque loads and functions to provide accurate torque control since it measures and is responsive directly to the torque load imposed on the power tool. In addition, the torque control mechanism is effective for either clockwise or counterclockwise torque transmission. Still further, the present invention provides a torque control mechanism capable of being easily calibrated for various torque values in the plant or in the field as well as being capable of easy and inexpensive maintenance because the only member subject to more than negligible wear and thus requiring replacement or which may require make-up fluid is the incompressible means.

What is claimed is:

1. A torque control mechanism for interrupting torque transmission between a driving member and a driven member comprising, a torque transmitter connected to one of said members for effecting torque transmission and upon a predetermined torque load to rotate relative thereto and move axially relative to the said one member, a relatively incompressible means capable of flowing when subjected to an external force disposed so as to be subjected by said torque transmitter to a force upon axial movement of said torque transmitter whereby said incompressible means is caused to flow, means cooperatively associated with said driven and driving members for effecting torque transmission through the driving and driven members, actuating means disposed to be actuated by said incompressible means upon flow thereof and connected to said first mentioned means for causing the latter to cease torque transmission through said driving and driven members, and means for varying the amount of flow of said incompressible means necessary to effect operation of said actuating means upon a predetermined torque.

2. A torque control mechanism for a power operated tool comprising, a driven member and a driving member drivably connected for transmission of rotation, control means for controlling the transmission of torque between the driving and driven members, torque transmitting means disposed adjacent one of said members, means for interconnecting the said one member and torque transmitting means, incompressible means capable of relatively substantial flow when subjected to an external force confined between said torque transmissing means and said one member, actuating means disposed for engagement with said incompressible means and said control means and responsive to actuate said control means to cease transmission of torque between said driving and driven members upon flow of said incompressible means, said interconnecting means including means to effect conjoined rotation of said one member and said torque transmitting means and upon a predetermined torque force convert said torque force into a linear force component to move said torque transmitting means relative to said one member and against said incompressible means to flow the latter against said actuating means so that the actuating means causes said control means to cease transmission of torque between said driven and driving members, and adjustment means for movement in a direction toward and away from the incompressible means to vary the torque force at which said incompressible means is effective to actuate said actuating means so that the actuating means causes the control means to cease transmission of torque between the driving and the driven members.

3. A torque control mechanism for a motor operated tool comprising, a driven member drivably connected for rotation to the motor, said driven member having a bore therein, control means for controlling the operation of the motor disposed in said axial bore in said driven member, a torque transmitter disposed in said bore for slidable linear movement therein, said torque transmitter having a pressure face spaced from said control means so as to define with the latter and said bore a cavity, an incompressible means capable of relatively substantial flow when subjected to an external force disposed in said cavity, means for interconnecting the driven member and said torque transmitter constructed and arranged to effect conjoined rotation of said driven member and said torque transmitter and upon a predetermined torque force resolve said torque force into a linear force component to move said torque transmitter relative to said driven member and against said incompressible means to flow the latter and effect actuation of said control means so that the latter ceases operation of said motor, and adjustment means for varying the size of said cavity so as to adjust the torque mechanism for operation at various preselected torque loads.

4. A torque control mechanism for a motor operated tool comprising, a driven member connected for rotation to said motor, control means for controlling operation of said motor, said driven member having a bore therein, a piston reciprocably mounted in one end of said bore, a feeler rod disposed at one end adjacent said piston and connected at the opposite end to said control means, said feeler rod being mounted for axial movement, a torque transmitter disposed in the opposite end of said bore and in spaced relationship with said piston to define with the bore and piston a liquid reservoir, a liquid disposed to fill said reservoir, seal means disposed in the interstices between the torque transmitter, piston and the bore to prevent leakage of liquid from the reservoir, a spring disposed in said reservoir to bias said torque transmitter away from said piston, spline means for interconnecting the driven member and the torque transmitter for conjoined rotation and upon a predetermined torque load effect movement of said torque transmitter relative to said driven member and in a direction toward said piston to thereby cause the liquid to flow and move said piston and, in turn, the feeler rod whereby said control means is actuated to cease operation of said motor, and adjustment means located in the torque transmitter for varying the size of said reservoir to thereby adjust the apparatus for various predetermined torque loads.

5. In a torque control tool of the character described comprising, a first and second clutch element with one of said clutch elements movable relative to the other whereby said elements are engaged and disengaged from each other, a locking means disposed for movement into and out of engagement with the movable clutch element, a plunger mounted for slidable movement relative to said locking means to allow in one position thereof movement of said locking means out of engagement with said second clutch element and in another position move and maintain said locking means in engagement with the movable clutch element to prevent movement of the latter out of engagement with the other clutch element, the combination of a torque mechanism comprising a torque transmitter disposed in one of said clutch elements, an incompressible rubber member capable of substantial flow when subjected to an external force disposed between said torque transmitter and said plunger, spline means for interconnecting the torque transmitter and the other clutch element for conjoined rotation and upon a predetermined torque load cause movement of said torque transmitter in a direction toward said incompressible rubber member to exert a force thereon and cause the latter to flow and thereby move said plunger to a position to allow said locking means to disengage from the movable clutch element and the latter to disengage from the other clutch element, and means to regulate the amount of preset flow of said rubber member so that the mechanism is adjustable for various predetermined torque loads.

References Cited by the Examiner
UNITED STATES PATENTS

| | | | |
|---|---|---|---|
| 2,512,032 | 6/50 | Mellert | 81—52.4 |
| 2,616,543 | 11/52 | Danly | 192—150 |
| 2,836,671 | 5/58 | Langstroth | 200—82.2 |
| 2,944,125 | 7/60 | Oliveau | 200—82.2 |
| 2,986,052 | 5/61 | Eckman et al. | 81—52.4 |
| 3,015,244 | 1/62 | Newman | 81—52.3 |

DAVID J. WILLIAMOWSKY, *Primary Examiner.*